United States Patent [19]
Clark

[11] 3,766,774
[45] Oct. 23, 1973

[54] APPARATUS AND METHOD FOR MEASURING BLOOD CHARACTERISTICS

[76] Inventor: Howard G. Clark, Durham, N.C.

[22] Filed: Feb. 18, 1972

[21] Appl. No.: 227,437

[52] U.S. Cl. .............................. 73/64.1, 23/230 B
[51] Int. Cl. .......................................... G01n 11/04
[58] Field of Search ...................... 73/64.1, 432 SD, 73/53; 23/230 B, 253 R

[56] References Cited
UNITED STATES PATENTS
3,503,709  3/1970  Yochem .......................... 73/64.1 X
3,518,057  6/1970  Giordano ......................... 73/64.1 X Primary Examiner—Richard C. Queisser
Assistant Examiner—Joseph W. Roskos
Attorney—B. B. Olive

[57] ABSTRACT

A closed tube in a circular configuration receives a blood sample which fills the tube and the tube with its sample is oscillated by a precision timing device to simulate reproducible in vivo blood flow conditions within the tube. The changing viscosity of the blood during clotting alters the period and amplitude of oscillation whose detection and measure are employed as a means for measuring the characteristics and morphology of clots, the rate of initiation of clotting by various materials, alterations in blood preceding clotting and related blood characteristics.

17 Claims, 12 Drawing Figures

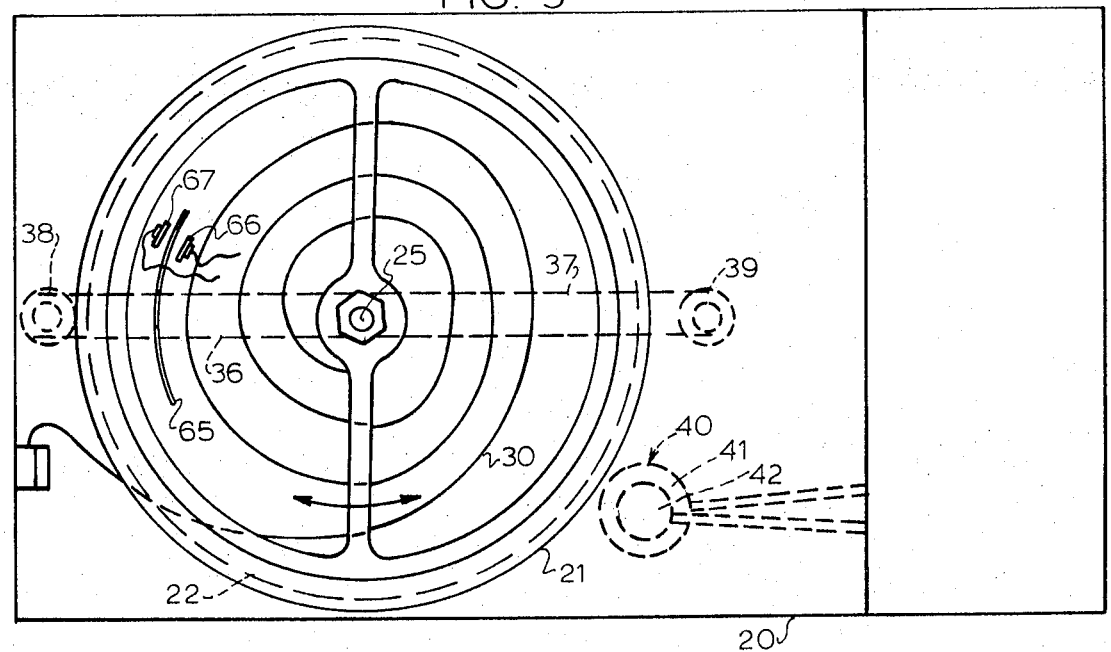
FIG. 3
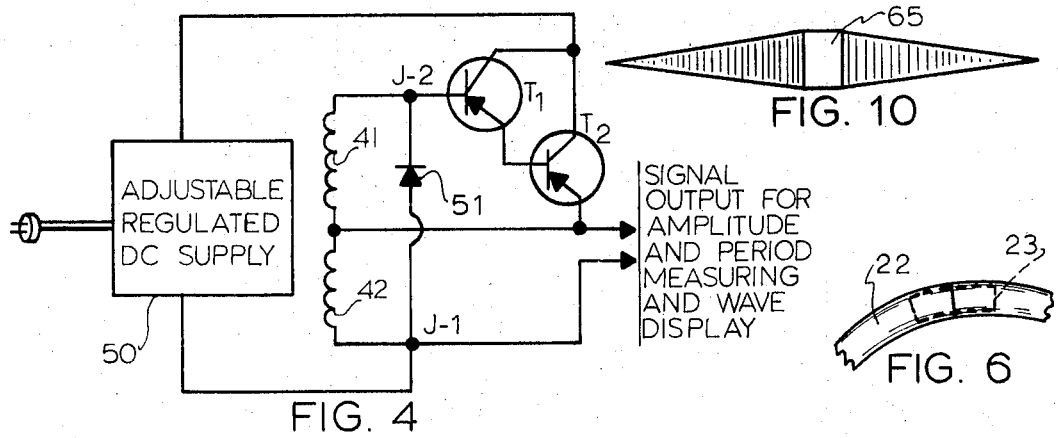
FIG. 4
FIG. 10
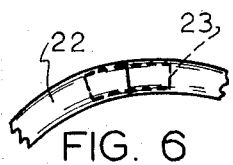
FIG. 6
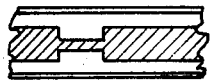
FIG. 7A
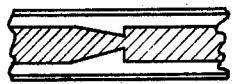
FIG. 7B
FIG. 7C
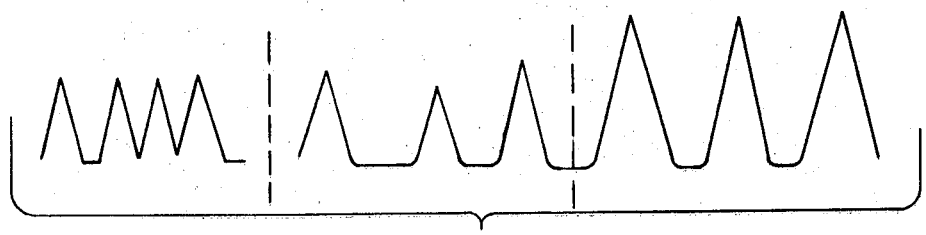
FIG. 5

APPARATUS AND METHOD FOR MEASURING BLOOD CHARACTERISTICS

BACKGROUND OF THE INVENTION

1. Field of the Invention:

This invention is related to devices for measuring changes in the character of fluid which take place during flow conditions. More specifically, the invention is related to methods and apparatus for simulating in vivo flow conditions of blood and for the purpose of clotting and measuring the related characteristics of blood as well as the relation of blood to materials contacted by blood under simulated flow conditions.

2. Description of the Prior Art:

Interest in the use of synthetic materials in contact with blood in artificial organs, blood bags, etc., has necessitated the development of screening methods for evaluating these materials. Frequently, in vitro test methods do not agree with in vivo uses of the materials. There are also a large number of patients with histories of cardiovascular illness whose clotting times are regularly monitored as part of preventive therapy. It would be desirable to have a simple in vitro test method using a small volume of blood which would closely simulate the conditions of the vascular system in which thrombi and emboli are formed. Techniques which quantitate the measurements of coagulation with a minimum of subjective involvement of the test operator are also desirable.

Various apparatus and methods are known in the prior art for the measurement of blood characteristics and the following United States patents are cited by way of example: U.S. Pat. Nos. 3,463,614; 3,503,709; 3,518,057; 3,520,659 and 3,560,163. Also note the work of Helmholz in the reference S. B. Akademie Wissenshaften Wien, V. 40, p. 607–658, 1980; also cited in Andrade, et al. "On the Determination of Viscosity by the Oscillation of a Vessel Enclosing a Fluid", (Parts 1 and 2), Proceedings of the Physiological Society, V. 48, 1936. It has also been known in the so-called "Chandler Wheel" to half fill a tube with blood, then rotate the tube at a fixed velocity. When clotting occurs the blood moves up and triggers a photo-cell. This method and apparatus has the marked disadvantage of introducing an air-blood interface and clotting almost invariably starts at the interface. While the cited and other known art has dealt with the problem in various ways and over a long period of time it is believed to be true that in no instance has the prior art recognized the possibility of oscillating a sample of blood in a closed tube completely filled with the blood and detecting and measuring the changes in amplitude and frequency brought about by preclotting and clotting changes as a measure of selected characteristics of the blood or as a measure of the reaction between the blood and a particular material of which the oscillating tube might be made. The prior art has used changes in optical density and electrical changes, e.g. conductivity, as a measure of blood character but in no reference has there been found mention or a suggestion of detecting a change in momentum of an oscillating tube containing a blood sample as a means of measuring a blood characteristic or a material characteristic affected by the blood.

SUMMARY OF THE INVENTION

The basic apparatus of this invention combines a continuous loop of tubing filled with the fluid, e.g. blood, which is to be measured and an oscillating timing device. The timing device may be for example (1) a balance wheel and hair spring, (2) a torsion pendulum, (3) a gravity pendulum, a mechanical or an electronic drive or combination of the same. The tube is attached to the timing device in such a way that it is continuously accelerating or decelerating except for the very minute periods of time at the end of each swing. For example, the tubing may be attached to the circumference of the balance wheel. As the wheel oscillates the inertia of the fluid in the tube causes the liquid to tend to remain stationary. The blood is thus oscillating with respect to the tubing wall. Interactions between blood and wall in this flow mode simulates pulsitile flow in the circulatory system. The small volume of blood ($12cm^3$ with a 7mm diameter tube) is put into a reproducible flow without damaging the formed elements which may be caused by other types of pumping with high localized shear. The volume of blood is also sufficient for the wheel to be stopped prior to clotting and the blood evaluated for hemolysis, partial thromboplastin time, etc. The frictional drag of the tubing wall couples part of the mass to the tubing thereby altering the period of the oscillation. The viscous losses decrease the amplitude of the oscillation. If the fluid changes in viscosity during measurement there will be corresponding changes in the period and amplitude of the oscillating wheel. If the fluid is blood, for example, there may be some agglutination of platelets causing an increase in the apparent viscosity of the blood after a short time. Later the blood will coagulate and essentially have an infinite viscosity. As more of the mass is coupled to the wheel the angular momentum of the wheel increases and the period is increased. When a clot occludes the lumen of the tube a maximum increase in the period will be obtained. The amplitude of the oscillation may decrease during early stages of coagulation if viscous energy losses increase. The wheel will normally be given an impulse by an escapement during each period to compensate for frictional losses. An electronic controlled magnetic pulse escapement is shown by way of example. When a clot occludes the lumen, energy is no longer lost due to tubing wall-blood friction and the amplitude increases.

Both the amplitude and the period may be measured by mechanical or electronic sensors as a function of time and the information stored or displayed in a variety of ways. The time to produce clotting is an important blood parameter, the knowledge of which, is useful in the diagnosis and treatment of disease. When a standard tubing surface and geometry are used and with standard setting of the spring or springs which regulate the wheel motion the present invention can be used to compare clotting times and preclotting viscosity changes in blood. The tube may be filled in such a way as to minimize contact of blood with foreign surfaces. The flow pattern is reliably reproduced. By lessening spring tension, the motion may be gentle and thereby approximate blood flow in the venous circulation and the smaller arteries, or with stiffer spring tension a more vigorous pulsitile motion is obtained which approximates arterial flow near the heart. Clotting observed in this manner resembles the clinically important clotting which takes place within the circulatory system more closely than other methods of in vitro testing. There is no excessive shear due to mechanical pumping which also makes this system unique among in vitro tests which use flowing blood. The ability to observe preclotting effects of viscosity increase also makes the present invention a valuable research tool for the study of blood disorders. The morphology of a clot formed under standard flow conditions can also be observed and may be important in the study of blood function.

Tubing can be made from many materials. The present invention permits the evaluation of the thrombogenicity of tubing made from different materials under conditions in which the tubing would be used. For example, blood from the same donor could be measured under standard motions of the wheel with tubes made of different polymers. The length of time to clot formation would be a good measure of the lack of thrombogenicity of the polymer. If the measurement were interrupted prior to clotting the tube could be emptied into a container, anticoagulant added and various measurements such as extent of hemolysis, partial thromboplastin, and the like, could be made. This would have an advantage over other test methods in that the blood would have been exposed to the tubing under precisely controlled flow conditions which approximate conditions in the vascular system.

In the specific apparatus later discussed in more detail the tube mounting wheel is oscillated by a hair spring and the wheel is effectively given a slight "kick" during each oscillation by a magnetic timing device which propels the wheel by magnetic repulsion. This electronic controlled circuitry thus initiates and maintains the conditions for a fixed amplitude and period of oscillation which are altered by the changing viscosity of the blood during running of each test.

DESCRIPTION OF THE DRAWINGS

FIG. 3 is a somewhat schematic plan view of the apparatus.

FIG. 4 is a circuit diagram of an electronic timing circuit employed in the apparatus of FIG. 1.

FIG. 5 shows generalized wave forms obtained during preclotting, clotting and post-clotting.

FIG. 6 is a plan view on a reduced scale of a portion of a typical sample tube showing how the ends of the tube are formed.

FIGS. 7A, 7B, and 7C illustrate alternate internal tube cross-sections of obstructions used to simulate blood vessel constrictions.

FIG. 10 is a side view of a curved metal sheet employed as a measuring device to induce capacitance between sensitive capacitor plates, as a measure of amplitude.

DESCRIPTION OF THE PREFERRED EMBODIMENT

The apparatus according to the preferred embodiment herein disclosed comprises basically an electronic driving and timing unit, a mechanical mount driven by the timing unit and a closed circular tube adapted to be removably received by the mount. Auxiliary to these basic components the apparatus includes means to vary the amplitude and period of the tube mount as induced by the timing device, means to detect, measure and record such amplitudes and periods and means to record the time of a particular event happening in the blood. These components and auxiliary means will now be described in more detail.

Figure 1:
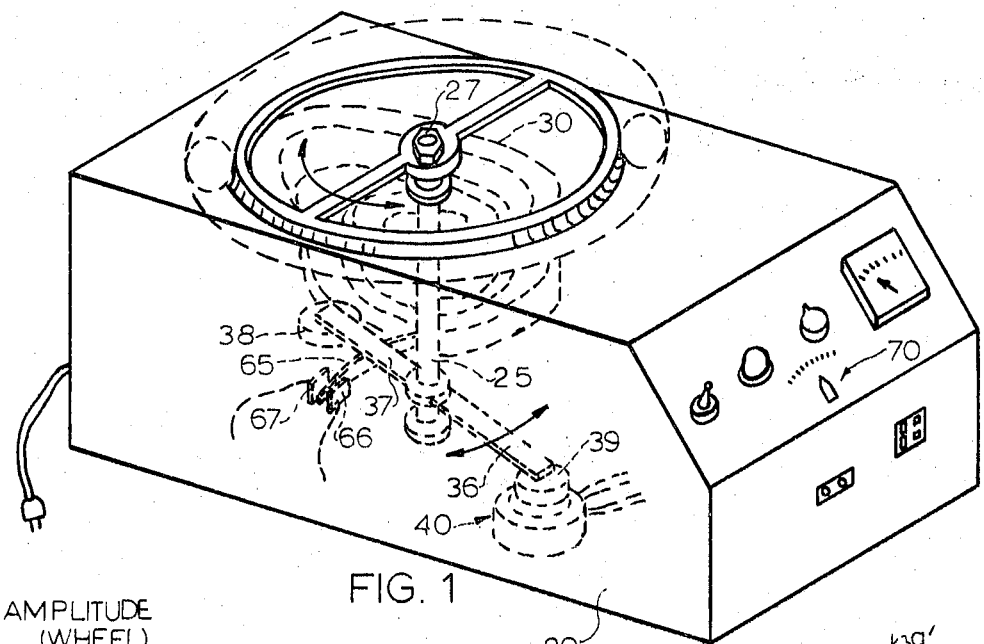
FIG. 1 is a perspective view of an apparatus embodying the invention and indicating in dashed lines the demountable tube for the blood, the magnetic pulsing components and a capacitor arrangement for measuring amplitude.
Figure 2:
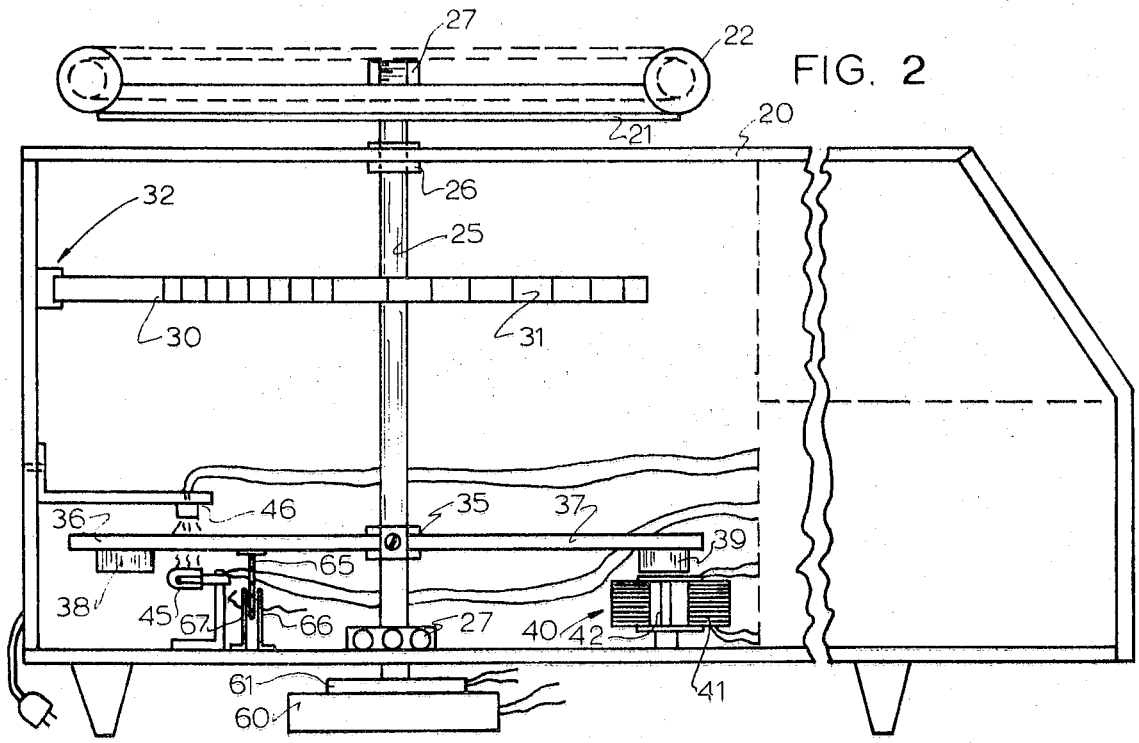
FIG. 2 is a somewhat schematic elevation section view of the apparatus.

Referring to FIGS. 1, 2 and 3 there is shown a housing 20 having mounted thereon a drive wheel 21 having a rim adapted to receive a sample tube 22 represented by dashed lines in FIGS. 1 and 2. Wheel 21 should be constructed of material having minimal mass, e.g. magnesium, aluminum, plastic, etc., especially in its rim portion so as to have minimal effect on the angular momentum of the system. Tube 22 in general may be of any material and dimension internally in which an unclotted blood sample is free to move back and forth with respect to the internal tube wall during the initial oscillation period and prior to the blood clotting. As shown in FIG. 6 the tube ends are joined by inserting a thin, short tube 23 within tube 22 at the juncture. A capillary tube of any material is obviously not suitable. On the other hand, a relatively large internal diameter tube within practical laboratory limitations would be suited to the invention. The tube material also controls the size tube best suited to the invention. A tube having absolutely no tendency to cause adherence of the clotted blood to the internal tube surface would not suit the invention. However, between this extreme and a tube surface having an extremely high frictional engagement with clotted blood there may obviously be many types of tube material suited to the invention. As examples, tubes have been made of glass, silicone rubber, and of "Tygon" material, a plasticized vinyl. In general, the results of the invention are readily obtainable with tubing ranging in internal diameter between about three millimeters to seven millimeters in size.

FIGS. 7A, 7B and 7C illustrate typical obstructions that might be placed in the tube 22 to give it a non-uniform internal cross-section. For example, a relatively "sharp" or "gentle" constriction could be simulated and could serve as a model for blood flow in arteriosclerosis. Such ridges are frequently required to induce clotting when using blood which does not clot easily. It should also be noted that some persons' blood does not clot due to an absence of coagulant components. Without coagulant additives, the invention apparatus should not be expected to induce clotting in blood of this type.

The above mentioned tubes may of course be of a greater variety of materials than those just indicated where the main purpose is to test the material rather than the blood. For clinical testing of a routine nature the tubes may be made of an expensive material and in a disposable form with the instrument being calibrated accordingly. Thus, mass screening of blood clotting for some designated purpose now becomes possible. The morphology of the clot is also of interest in predicting performance of the tubing material in the circulatory system. For example, when glass tubing (7mm diameter) is used in a 2.2 second harmonic oscillation a firmly adherent clot has been observed to form. With plasticized vinyl under the same conditions, a clot has been observed which is adherent in only a few spots and may break free like an embolism. This important blood parameter, which frequently causes coronary trombosis, is easily detected and observed since the period of the wheel markedly decreases concurrent with the breaking clot.

Figure 8:
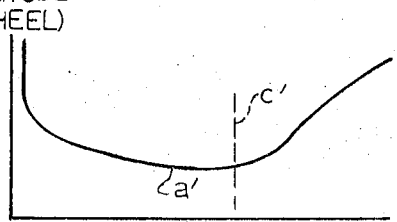
FIG. 8 is a generalized curve showing blood viscosity in relation to wheel amplitude during clotting.
Figure 9:
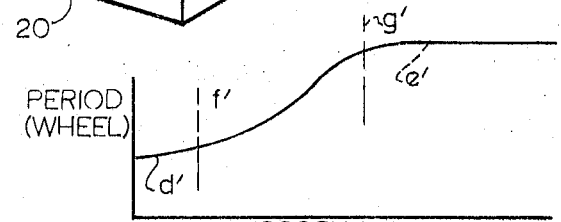
FIG. 9 is a generalized curve showing blood viscosity in relation to wheel period during clotting.

Referring to FIG. 8, there is shown a graph of wheel amplitude in relation to viscosity during clotting. The pre-clotting amplitude $a'$ is shown to be relatively low, while the amplitude during clot formation is shown to rapidly increase. The point of initiation of clotting is indicated by vertical dashed line $c'$, at the base of the sharp change in slope. Referring now to FIG. 9, a graph of wheel period in relation to viscosity, it will be noted that a pre-clotting period for the wheel is established at $d'$. A gradual change in period occurs between dashed lines $f'$ and $g'$ as a clot begins to form. Finally, a peak period is reached and maintained at $e'$ when the clot finally occludes the lumen of the tube, as viscosity becomes infinite. In regard to FIGS. 8 and 9, it showed be understood that these are highly generalized curves to explain the invention and do not necessarily represent a specific blood type or set of operating conditions.

Referring back to FIGS. 1, 2 and 3, it will be noted that wheel 21 is mounted on shaft 25. Shaft 25 operates in precision bearings 26, 27 and on its upper end mounts a retaining nut 28 which retains wheel 21 and makes it easily removable. A snug friction fit may also be employed for the same purpose. Shaft 25 is coupled to a hair spring 30 which is attached to shaft 25 as indicated at 31 and is anchored to the housing 20 as indicated at 32. Spring 30 of course serves as a means of storing and releasing energy and except for frictional losses establishes the conditions for a fixed amplitude and period of oscillation.

The shaft 25 also mounts a hub 35 from which extends arms 36, 37 which in turn mount on their respective ends blocks 38, 39 made of a magnetizable material. It will also be seen that the path of motion of blocks 38, 39 causes them to pass over a magnetic sensing and driving coil structure 40. Coil structure 40 contains two coils, best shown in FIG. 3, one of which, coil 41, is adapted to sense the presence or approach of one of the magnetic blocks 38 or 39 and the other of which, coil 42, is adapted to repel the same particular sensed block in its same direction of movement. Thus, by accurately timing the sensing and repelling, the wheel 21 on which tube 22 is mounted is effectively given a "kick" on each swing which compares with a mechanical escapement and by electronic design precisely makes up for the frictional losses in the train of oscillating components.

It should be understood as previously mentioned that the desired oscillatory motion coud be induced by a clock movement, e.g., the "Black Forest" type of oscillatory clock movement or the familiar clock type pendulum movement. By an appropriate oscillatory motor 60 and electrical clutch mechanism 61 as generally indicated in FIG. 2, wheel 21 may be positively driven initially for a predetermined period prior to clotting and then just prior to clotting the clutch 61 may be disconnected so as to allow wheel 21 to oscillate with its natural period and so as to subject the momentum of wheel 21 to the influence of the blood viscosity. It should be understood that whatever electronic or mechanical escapement mechanism, positive drive means or combination are utilized to sufficiently maintain the oscillatory motion and momentum of the wheel, the effects of any driving or escapement means should not substantially reduce or negate any effects which a change in viscosity of the fluid being oscillated might otherwise exert on the period and amplitude of the wheel. That is, the change in viscosity of the fluid must produce a measurable change in momentum of the oscillating assembly. The sample tube can be mounted vertically or horizontally as required to give the blood sample within the tube the required oscillation to simulate in vivo conditions. It will also be noted that a lamp 45 and photocell 46 are shown and which are available for detecting the presence of arms 35, 36 as a measure of both period and amplitude. An alternate means of measuring both period and amplitude is shown in FIGS. 1 and 3 to include a wedge-shaped metal sheet 65, also shown in FIG. 10, attached to arm 38 and capacitor plates 66, 67 adapted to measure the electrical change in capacitance between plates 66 and 67 as sheet 65 oscillates between said plates. That is sheet 65 causes the measured capacitance between plates 66, 67 to vary dependent on the position of arm 36 which becomes a measure of the amplitude. While not shown, it will be understood that leads from plates 66, 67 are connected to appropriate circuitry adapted to convert the measured capacitance to an amplitude reading, e.g., a continuous recording measuring device, oscilliscope, or other well-known means. Thus, the information produced by such photo-electric and capacitance detection may be readily converted by well-known means to indicate, display and record both period and amplitude in relation to time. Since such circuitry is well-known it is not dealt with here in any further detail.

Referring back to the mentioned mechanical components which are required to maintain oscillation, it should be mentioned that all of the oscillating components and particularly those which are swinging on a relatively long radius should be of minimal mass so as to minimize their effect on angular momentum, and thereby maximize the effect on momentum of the fluid viscosity change. Thus, in addition to the rim portion of wheel 21, arms 36 and 37 should be of minimal weight as should the blocks 38 and 39 so as to allow the change in viscosity in blood during the clotting process to have a maximum effect on the angular momentum to provide the most favorable detecting and measuring conditions.

In FIG. 4 there is shown an electronic circuit used in connection with sensing coil 41 and drive coil 42. In addition to these coils the circuitry shown includes an adjustable DC supply 50, a pair of transistors T-1 and T-2 arranged in a so-called Darlington pair configuration and a diode 51. In operation when neither sensing coil 41 nor the driving coil 42 are excited the transistor pair is cut off due to reverse bias of the emitter junction in transistor T-1. The moving magnet, i.e., block 38 or 39, induces a current in sensing coil 41 which forward biases the base-emitter junction in transistor $T_1$. The effect of the Darlington Pair configuration is to yield a high current gain. The emitter branch of transistor $T_2$ draws current from the voltage supply 50 which current upon passing through driving coil 42 induces a magnetic field which is oriented to repel the magnet, i.e., block 38 or 39. The voltage drop across the system, i.e., across junctions J-1, J-2, is used to activate a reference timing. As previously mentioned, a sensitive photoelectric switch or capacitive means may also be used to observe the wheel movement, i.e., amplitude and period. Naturally, any other type of rapid action switch or sensing device known to those skilled in the art which does not add a substantial friction load to the moving assembly may be used for the reference timing.

Various mechanical or electrical adjustments may be made to change amplitude and period through externally mounted manually operable controls. The voltage supplied by supply 50 may be changed by control 70 or, for example, the stiffness of spring 30 may be changed. In addition, the diameter of wheel 21 may be increased or decreased with corresponding changes in the diameter of tube 21. The relative positions of the magnetic blocks 38, 39 and the coil structure 40 may be varied. With any of these or other equivalent variations the conditions may be established for initiating and maintaining the conditions for a particular amplitude and period with a particular blood sample and tube type. The selected amplitude and period thus provide a very precise and fixed base of reference from which changes in amplitude and period may be detected and measured as an indication of a selected characteristic of the blood or tube material. In one embodiment the period has been varied from 1.5 to 3 seconds and the amplitude from 60° to 300° with a constant mass wheel and without serious degradation of its periodic reproducibility.

According to the method of the invention, the following basic steps are involved, all at room temperature, in the measurement of a selected blood characteristic, e.g., a pre-clotting or clotting characteristic:

1. Purge the sample tube of all foreign matter by filling the same completely with a pure isotonic (air free) saline solution.
2. Displace the saline solution with a selected blood sample so as to have the tube completely filled with the blood and in a manner wherein the blood contacts a minimum of surfaces other than the filling needles and tubing wall. The blood sample may be derived directly from a living or a deceased body or from a stored sample.
3. Install and secure the sample tube on the oscillatory mount.
4. Start the timing device after giving the mount an initial starting swing if self-starting means are not employed, and engage escapement mechanism to compensate for frictional losses, such that the tube and its mount within a time period of a few seconds adopts and maintains oscillatory motion of fixed amplitude and period according to the escapement mechanism.
   a. Alternately, start the device by engaging positive oscillatory drive means via an appropriate clutch and prior to clotting, disengage the positive drive means and engage an escapement means which compensates for frictional losses.
5. While maintaining the drive conditions of the time device constant, detecting, measuring and recording the amplitude and/or period of the tube while simultaneously recording the time.
6. Relating the event, e.g., clotting, to the amplitude and/or period as a measure of the character of the blood with respect to such event.

As previously mentioned, the invention method may also be applied to comparing the relation of a selected blood characteristic to a selected material. In this case the same basic method is employed with respect to identical blood samples or a known group of different blood samples but utilizing tubes made of differing material. For example, a blood type X can be installed in a tube made of material Y and observed as to event or characteristic Z. This can be compared for example with the sameblood type X in a tube made of material U and observed as to the same event or characteristic Z. An artificial nylon artery versus an artificial Teflon artery could be compared in this way with respect to clotting for example.

The device is normally started by lightly swinging the wheel which very quickly gets into step with the established initial period and this can be seen visually as indicated in FIG. 5 in the wave diagram on the left which may be detected and displayed. If the character of the blood were not subject to change this steady state condition would, of course, be maintained. As the blood begins to coagulate, the displayed wave form is erratic as indicated in the central wave form of FIG. 5. Finally, once the blood has fully coagulated the system again returns to a fixed period but different from the initial period as generally indicated on the right of FIG. 5.

While the invention has been explained in connection with the analysis of blood and materials associated with blood it is recognized that the invention in a broader sense offers a general method and means for analyzing characteristics of other fluids and material. For example, a lubricating oil may be the sample fluid and the test may be conducted under conditions which cause the fluid to become more viscous. As another example, the sample tube may be filled with a powdered material, e.g., powdered metal, which tends to compact itself when oscillated in the manner of the invention and the rate of compaction is a matter of interest. Thus, the word "fluid" is used in the claims in this broad sense.

A circular tube is preferred as shown. The tube material should be adapted to filling and evacuation by wall penetration with a syringe needle and should be of a self sealing nature when the needle is withdrawn. It is also contemplated that configurations other than circular and filling-evacuation means other than needle penetration might be employed with the oscillatory means of the invention.

While not shown it is recognized that the tube instead of being made entirely of a self-sealing material adapted to needle penetration could be formed with a pair of oppositely disposed self-sealing ports generally like those used for inflating basketballs, toy plastic balls and the like. In either case the tube may be initially filled with saline or other purging solution from a syringe at one point of tube penetration or port and the air withdrawn through a needle at an opposite point of penetration or port. Then, the saline may be evacuated through a needle at one penetration point or port while the blood or other liquid sample is introduced from a syringe at an opposite penetration point or port.

It should also be recognized that the method and apparatus of the invention are generally based on (a) there being relative motion between the wall of the confining void and the liquid being measured, (b) on the container establishing the elongated void being oscillated, and, (c) on the liquid during oscillation producing a detectable change in momentum which can be measured. In the preferred embodiment for blood measurements the void will be open and continuous and the sample will fill the void. However, it is recognized that semi-circular and other elongated tube configurations may be used in which the void is not open and continuous but has defined ends. Also, in certain alternative applications the sample may fill less than the entire volume of the elongated void and still develop and detectable and measurable change in momentum that can be related to viscosity in the sense of the invention. In such cases the void space unoccupied by the sample may be occupied by an air bubble or for example by a steel ball. Thus, the air bubble may change position or relative size or the ball may move back and forth during oscillation of the void wall and until retarded by the change in viscosity and in either case upon the occurrence of a change in viscosity there would be produced the desired measurable change in momentum which can be related to the viscosity of the sample in question.

What is claimed is:

1. An apparatus for detecting a change in viscosity of a fluid where the fluid is of a type whose viscosity changes when subjected to oscillation within and with respect to a confined space comprising, in combination:
   a. a container having an internal wall surface forming an elongated closed void adapted to receive and confine within the void a measured sample of the fluid and adapted to be oscillated;
   b. oscillatory means including friction compensation means adapted to mount and maintain said container in oscillation at some predetermined period and amplitude whereby to cause said fluid to initially oscillate within and with respect to said wall surface; and
   c. means to detect and measure the character of said oscillation whereby to detect a change in the nature thereof brought about by a change in the viscosity of said fluid, said oscillatory means being adapted whereby the momentum thereof is affected by said viscosity changes.

2. An apparatus as claimed in claim 1 wherein said tube comprises a closed circular tube and said oscillatory means includes a wheel adapted to mount and oscillate said tube in a horizontal plane about the central axis of said tube.

3. An apparatus as claimed in claim 2 wherein said oscillatory means includes a vertical shaft mounting said wheel, a coil spring having one end fixed to said shaft and one end fixed and magnetic circuitry means adapted on each oscillatory swing to apply a magnetic repulsion force in the respective direction of movement to compensate for frictional losses in said oscillatory means.

4. An apparatus as claimed in claim 3 wherein said magnetic circuitry means includes oppositely disposed magnetizable blocks mounted on the ends of arms extending radially oppositely from and mounted on said shaft and sensing and propelling coils with associated circuitry whereby the presence of each respective block with respect to a particular position in the path of oscillation is sensed on each swing and controls the energization of said propelling coil at the same said position to apply said repelling force on each swing at such position.

5. An apparatus as claimed in claim 4 wherein said tube has an internal cross-section of non-uniform configuration to simulate a blood vessel constriction.

6. An apparatus as claimed in claim 5 wherein the period and amplitude of said oscillation is variable by control means not associated with the changing of viscosity of said fluid.

7. An apparatus as claimed in claim 1 wherein said fluid is blood.

8. An apparatus as claimed in claim 1 wherein said fluid is blood and said void is sized to be completely filled by said sample.

9. An apparatus as claimed in claim 1 wherein said oscillatory means include continuously operative positive drive means engagable therewith and adapted to initiate upon engagement a positive oscillatory motion of said container at a predetermined period and amplitude not affected by said change in viscosity and upon disengagement being adapted to allow said frictional compensation means to maintain said oscillatory motion at a period and amplitude subject to said change in viscosity.

10. The method of detecting a change in viscosity of a fluid where the fluid is of a type whose viscosity changes when subjected to oscillation within and with respect to a confined space, comprising:
    a. installing a sample of the fluid in a container having an internal wall surface forming an elongated closed void adapted to receive and confine the sample within the void and being adapted to be oscillated around a selected fixed axis;
    b. oscillating said container about said axis whereby to cause said fluid to initially oscillate with respect to said wall surface and said void to oscillate at a fixed initial amplitude and period;
    c. while continuing the same force and timing applied to oscillate said container at said initial amplitude and period allowing said fluid to continue to oscillate in said void until a change in the viscosity of said fluid occurs therein;
    d. at the time of said change in viscosity allowing such viscosity change to effect a change in said oscillation amplitude and period; and
    e. sensing and measuring the character of said change as an indication of the character of said fluid.

11. The method of claim 10 wherein said fluid is blood.

12. The method of claim 11 wherein said container is a closed circular tube and said sample is installed in sufficient quantity to fill said tube.

13. The method of claim 12 wherein said tube is formed at least partially of a self-sealing material adapted to allow said tube to be filled and evacuated by syringe needle wall penetration.

14. The method of claim 10 wherein said sample is held consistent as to the nature of said fluid and said container is varied as to the nature of the material of which made whereby to measure the effect of different materials with respect to said change in viscosity.

15. The method of claim 14 wherein said fluid is blood.

16. The method of claim 15 wherein said void is formed with a non-uniform internal cross-section to simulate an in vivo vessel restriction.

17. The method of claim 10 wherein said container is initially oscillated at a predetermined period and amplitude by positive drive means adapted to be disengageable prior to said change in viscosity.

* * * * *

UNITED STATES PATENT OFFICE
CERTIFICATE OF CORRECTION

Patent No. 3,766,774      Dated October 23, 1973

Inventor(s) Howard G. Clark

It is certified that error appears in the above-identified patent and that said Letters Patent are hereby corrected as shown below:

Col. 1, line 36, "1980" should be -1860-.

Col. 5, line 19, "showed" should be -should-.

Col. 5, line 54, "coud" should be -could-.

Col. 9, line 3, the second appearance of "and" should be -a-.

Signed and sealed this 19th day of November 1974.

(SEAL)
Attest:

McCOY M. GIBSON JR.
Attesting Officer

C. MARSHALL DANN
Commissioner of Patents